(12) United States Patent
Liu

(10) Patent No.: US 9,085,009 B2
(45) Date of Patent: Jul. 21, 2015

(54) PUNCTURE RESISTANT LEAKLESS MATERIAL FOR TUBELESS TIRE AND ITS MANUFACTURING AND SPRAY COATING METHODS

(75) Inventor: Jian Liu, Jiangyin (CN)

(73) Assignee: Qinze United Industrial Co., Ltd., Shanghai (CN)

( * ) Notice: Subject to any disclaimer, the term of this patent is extended or adjusted under 35 U.S.C. 154(b) by 626 days.

(21) Appl. No.: 13/395,036

(22) PCT Filed: Feb. 24, 2011

(86) PCT No.: PCT/CN2011/000286
§ 371 (c)(1),
(2), (4) Date: Mar. 8, 2012

(87) PCT Pub. No.: WO2012/113099
PCT Pub. Date: Aug. 30, 2012

(65) Prior Publication Data
US 2012/0277335 A1    Nov. 1, 2012

(51) Int. Cl.
| | |
|---|---|
| C08L 53/00 | (2006.01) |
| B60C 1/00 | (2006.01) |
| B60C 99/00 | (2006.01) |
| B05C 1/00 | (2006.01) |
| B29C 73/16 | (2006.01) |
| B29D 30/06 | (2006.01) |
| C08K 5/09 | (2006.01) |
| C08L 7/00 | (2006.01) |
| C08L 15/00 | (2006.01) |
| C08L 91/06 | (2006.01) |
| B60C 19/12 | (2006.01) |
| C08K 3/26 | (2006.01) |

(52) U.S. Cl.
CPC ............... *B05C 1/00* (2013.01); *B29C 73/163* (2013.01); *B29D 30/0685* (2013.01); *C08K 5/09* (2013.01); *C08L 7/00* (2013.01); *C08L 15/00* (2013.01); *C08L 91/06* (2013.01); *B29D 2030/0697* (2013.01); *B60C 19/12* (2013.01); *C08K 2003/265* (2013.01)

(58) Field of Classification Search
USPC ....................................... 525/88, 95; 523/166
See application file for complete search history.

(56) References Cited

U.S. PATENT DOCUMENTS

2010/0116398 A1* 5/2010 Zhang et al. .................. 152/504

FOREIGN PATENT DOCUMENTS

| CN | 1931910 A | 3/2007 |
| CN | 100594225 C | 3/2010 |

OTHER PUBLICATIONS

Liu et al, electronic translation of the specifcation of CN 1931910, Mar. 2007.*

* cited by examiner

*Primary Examiner* — Jeffrey Mullis
(74) *Attorney, Agent, or Firm* — Drinker Biddle & Reath LLP

(57) ABSTRACT

A method of manufacturing a puncture resistant leakless material for tubeless tires, the puncture resistant leakless material manufactured thereof, and a method of spray coating the puncture resistant leakless material to tires are described. Thermoplastic elastomers are used as the framework material for the puncture resistant leakless material. The puncture resistant leakless material resists high temperature, low temperature, oil, and water, has high leakproof properties, and has low manufacturing costs. The puncture resistant leakless material also has a high tear resistance, a great resilience, and a long service life. The raw materials for manufacturing the puncture resistant leakless material fir tubeless tire do not need to undergo vulcanization, resulting in reduced energy consumption and lowered manufacturing costs.

3 Claims, No Drawings

PUNCTURE RESISTANT LEAKLESS MATERIAL FOR TUBELESS TIRE AND ITS MANUFACTURING AND SPRAY COATING METHODS

FIELD OF THE INVENTION

This invention relates to a puncture resistant leakless material for tubeless tire and its manufacturing and spray coating methods.

BACKGROUND OF THE INVENTION

At present, there are some records of several kinds of puncture resistant leakless materials for tubeless tire and their manufacturing and spray coating methods.

An invention patent (No. ZL200610161646.3), which applied by the applicant, has disclosed a puncture resistant leakless material for tubeless tire and its manufacturing and spray coating methods. However, after some further experiments, it is found out that since the component contains lower reinforcing agent, namely tower content of carbon 5 or carbon 9, its features of tear resistance, resilience and service life of the material have to be much enhanced. In the absence of tackifier, when there is a sharp object in the tire, or when the sharp object pulled out and using the puncture resistant leakless material to keep the tire pressure not reduced, the distance with high speed running also needs to be increased.

Patent application, publication No. CN1931910, discloses a puncture resistant leakless material for tubeless tire and manufacturing method thereof. But after some further experiments, it is found out that natural rubber used in the application, which has to be vulcanized, makes the producing procedure complex and costs much more energy.

SUMMARY OF THE INVENTION

The object of this invention is to provide a puncture resistant leakless material and its manufacturing and spray coating methods. The puncture resistant leakless material resists high temperature, low temperature, oil and water, has high leakproof property, costs low, and could keep running for a very long time without leakage or dropping of pressure when a sharp object punched through, or even when there is a sharp object in the tire.

After repeating experiments, the technical solution of the invention is as follows:

A method for manufacturing puncture resistant leakless material for tubeless tire, which uses thermoplastic elastomer as its framework material, characterized in that the said method comprising the following processing steps:

(1) stirring raw material A in a reactor for foaming for 12 to 24 hours;

(2) mixing raw material B in an internal mixer for 30 minutes at a constant temperature of 120° C., discharging, cooling, crushing to particles and setting still for 48 hours;

(3) raw material C according to weight ratio;

(4) putting the raw material A from step (1) and the raw material B from step (2) in accordance with a ratio of A:B=0.4-0.75 into an extruder which connects to a reactor with nitrogen atmosphere and a stirrer, the said stirrer has a rotation speed of 120 revolutions per minute, and adding the component C in when ⅓ of the mixture of the said A and B has been extruded; and (5) after the adding all of raw materials, refluxing and stirring at a constant temperature of 225° C. for 4 hours until all raw materials melt completely, discharging and cooling to 170-190° C.

The method for manufacturing puncture resistant leakless material for tubeless tire, using the raw materials which comprising: raw material A, which contains 100 portions of SEPS by weight and 80 to 150 portions of MDT silicone oil by weight; component B, which contains 60 portions of silicon rubber by weight, 30 to 50 portions of carbon black by weight, 5 to 20 portions of microsilica by weight and 5 to 20 portions of calcium carbonate by weight; and component C, which contains 0.5 to 2 portions of polyether modified silicone oil by weight, 10 to 30 portions of di(tert-butoxy)diacetoxy-silane, 0.6 to 1.2 portions of dibutyltin dilaurate by weight and 0.5 to 1.5 portions of cross-linking agent by weight.

According to an alternative solution of the invention, it comprises: component A, which contains 100 portions of ultralow-hardness thermoplastic elastomer material by weight and 30 to 50 portions of naphthenic hydrocarbon oil by weight; component B, which contains 50 portions of chlorobutyl rubber by weight, 10 portions of EPDM rubber by weight, 30 to 50 portion of carbon black by weight, 4 portions of zinc oxide by weight, 1 portion of magnesium oxide by weight, 2 portions of DM by weight, 1 portion of wax by weight, 10 to 30 portions of calcium carbonate by weight and 2 to 5 portions of softener by weight; and component C. which contains 50 to 100 portions of tert-octyl phenolic resin by weight, 30 to 60 portions of terpene resin by weight and 2 portions of polyisobutene by weight.

According to another alternative solution of the invention, it comprises: component A, which contains 100 portions of SEBS by weight and 150 to 300 portions of naphthenic hydrocarbon oil by weight; component B, which contains 50 portions of butyl rubber by weight, 10 portions of chlorobutyl rubber by weight, 10 portions of polybutylene by weight, 30 to 50 portions of carbon black by weight, 10 to 30 portions of calcium carbonate by weight, 10 to 20 portions of argil by weight, 1 to 5 portions of softener by weight and 1 to 5 portions of zinc oxide by weight; and component C, which contains 5 portions of modified resin by weight, 100 to 150 portions of terpene resin by weight, 25 to 50 portions of petroleum resin by weight and 1.5 to 3 portions of coupling agent by weight.

The third alternative solution of the invention comprises: component A, which contains 100 portions of SEPTON by weight and 100 to 250 portions of paraffin oil by weight; component B, which contains 40 portions of bromobutyl rubber by weight, 20 portions of ethylene propylene rubber by weight, 30 to 50 portions of carbon black by weight, 1 portion of magnesium oxide by weight, 1 to 5 portions of zinc oxide by weight, 3 to 5 portions of stearic acid by weight, 2 portions of DM by weight, 10 to 20 portions of talc powder by weight, 10 to 20 portions of diatomite by weight and 2 to 5 weight portions of softener by weight; and component C, which contains 80 to 120 portions of terpene resin by weight, 50 to 80 portions of petroleum resin by weight and 1.5 to 3 portions of coupling agent by weight.

A method for spray coating the puncture resistant leakless material for tubeless lire, characterized in that the method comprising the following processing steps:

Step 1—opening general power supply of spraying equipment, setting up temperature of melting reactor at 240° C., temperature of gathering vessel between 180° C. and 220° C., temperature of spraying pump between 180 C. and 220° C. and temperature of spraying pipe at 180° C.;

Step 2—gradually adding the puncture resistant leakless material for tubeless tire to the melting reactor for melting, then putting the melted material into the gathering vessel, stirring for balancing temperature of material, and start spraying when the gathering vessel is filled more than half of volume with the material; and Step 3—placing a clean and dry tire in the spraying equipment in a suitable position and setting the rotate speed and spray time suitable for the tire, specific steps comprising:

a. smoothly rotating the tire with a speed of 150 revolutions per minute;

b. the sprayer and the spraying pipe up move to the specific locations automatically;

c. heating spray coating surface with a heated air to a temperature of 60 to 70° C. in around 1 minute;

d. setting up the spraying pump with, an output of 1 kilogram per 5 seconds, and adjusting the working time of the spraying pump to achieve corresponding effect for different types of tire;

e. stopping spraying, and rotating the tire at a speed of 250 revolutions per minute to improve adhesion between the sprayed puncture resistant leakless material and the tire, dynamic balance of the tire, surface flatness, and smoothness of the tire;

f. blowing cool air to the spray coating surface while increasing the speed of rotation for about 2 minutes to reach a temperature of 120° C., resetting the spraying equipment, and retrieving the tire.

The puncture resistant leakless material for tubeless tire of the invention has high tear resistance, resilience and long service life. When there is an edged object or a steel nail in the tire, or when the edged object or the steel nail pulled out, tire using the material of the invention could keep running in a high speed for a very long time without leakage or dropping of pressure. The raw materials for manufacturing the puncture resistant leakless material for tubeless tire of the invention do not need vulcanization, which saves much energy and costs during the manufacture.

SPECIFIC EMBODIMENTS

Example 1

The method for manufacturing puncture resistant leakless material for tubeless tire, which comprises:

component A, which contains 100 portions of SEPS 4055 by weight, made in Japan, 80 to 150 portions of MDT silicone oil 500-1000CS by weight, made in Shandong;

component B, which contains 60 portions of silicon rubber MF175U by weight, made in Guangzhou, 30 to 50 portions of carbon black by weight, 5 to 2.0 portions of microsilica with a relative density of 2.65 by weight made in Pennsylvania and 5 to 20 portions of calcium carbonate BaiyanhuaA by weight; and component C, which contains 0.5 to 2 portions of polyether modified silicone oil BD3231 by weight, 10 to 30 portions of di(tert-butoxy)diacetoxy-silane by weight, 0.6 to 1.2 portions of dibutyltin dilaurate by weight and 0.5 to 1.5 portions of cross-linking agent by weight.

Example 2

The method for manufacturing puncture resistant leakless material for tubeless tire, wherein comprises:

component A, which contains 100 portions of ultralow-hardness thermoplastic elastomer 9053 by weight, made in Japan, 30 to 50 portions of naphthenic hydrocarbon oil 250N by weight, made in Russia;

component B, which contains 50 portions of chlorobutyl rubber TANXESS1240 by weight, 10 portions of EPDM rubber EP25 by weight, made in Japan, 30 to 50 portions of carbon black by weight, 4 portions of zinc oxide by weight, 1 portion of magnesium oxide by weight, 2 portions of DM by weight, 1 portion of microcrystalline wax by weight, 10 to 30 portions of calcium carbonate by weight and 2 to 5 portions of coumarone by weight; and component C, which contains 50 to 100 portions of tert-oetyl phenolic resin 204 by weight, made in Shandong, 30 to 60 portions of terpene resin T120 by weight, made in Jiangxi, and 2 portions of polyisobutene PB by weight, made in Korea.

Example 3

The method for manufacturing puncture resistant leakless material for tubeless tire, which comprises component A, which contains 100 portions of SEBS 3151 by weight, made in Taiwan, 150 to 300 portions of naphthenic hydrocarbon oil of 64# by weight, made in Xinjiang; component B, which contains 50 portions of butyl rubber Exxon 268 by weight, made in USA, 10 portions of chlorobutyl rubber LANXESS1240by weight, 10 portions of polybutylene PB900 by weight, made in Korea, 30 to 50 portions of carbon black by weight, 10 to 30 portions of calcium carbonate BaiyanhuaA by weight, made in Japan, 10 to 20 portions of argil by weight, 1 to 5 portions of softener by weight and 1 to 5 portions of zinc oxide by weight; and component C, which contains 5 portions of modified resin 803L by weight, made in Japan, 100 to 150 portions of terpene resin T120 by weight, made in Jiangxi, 25 to 50 portions of petroleum resin C9120 by weight, made in Jiangsu, and 1.5 to 3 portions of coupling agent KH143 by weight, made in Jiangsu.

Example 4

The method for manufacturing puncture resistant leakless material for tubeless tire comprises:

component A, which contains 100 portions of SEPTON® 4077 by weight, made in Japan, 100 to 250 portions of paraffin oil of 300# by weight made in Xinjiang; component B, which contains 40 portions of bromobutyl rubber Exxon 2244 by weight, made in USA, 20 portions of ethylene propylene rubber EPST by weight, made in Japan, 30 to 50 portions of carbon black by weight, 1 portion of magnesium oxide by weight, 1 to 5 portions of zinc oxide by weight, 3 to 5 portions of stearic acid by weight, 2 portions of DM by weight, 10 to 20 portions of talc powder by weight, 10 to 20 portions of diatomite by weight and 2 to 5 portions of coumarone by weight; and component C, which contains 80 to 120 portions of terpene resin T120 by weight, made in Jiangxi, 50 to 80 portions of petroleum resin C9120 by weight, made in Jiangsu, 1.5 to 3 portions of coupling agent KH143 by weight, made in Jiangsu.

Example 5 a. Test of High Temperature Resistance

A puncture resistant leakless material for tubeless tire was manufactured using, the raw materials of Example 1. This puncture resistant leafless material was then placed into an oven for high-temperature resistance test, and the results are as follows:

Ambient temperature: 12° C.

TABLE 1

| Setting of experimental conditions | | |
| --- | --- | --- |
| Item | Technical requirement | Test Data |
| Temperature of oven | 100° C. | 101° C. |
| Time of heating | 2 hours | 3.3 hours |
| Number of screwdriver | 3 | 3 |
| Diameter of screwdriver | 5 mm/5 mm | 6 mm/5 mm |

TABLE 2

| Results of test | | | | |
| --- | --- | --- | --- | --- |
| Item | Initial Pressure | Pressure after heating | Pressure after punch | Status of coating |
| Results | 2 Kg/cm2 | 3.6 Kg/cm2 | 3.6 Kg/cm2 | No flow or deformation |

A puncture resistant leakless material for tubeless tire was manufactured using the raw materials of Example 2. This puncture resistant leakless material was then placed into an oven for high-temperature test, and the results are as follows:

Ambient temperature: 12° C.

TABLE 3

| Setting of experimental conditions | | |
| --- | --- | --- |
| Item | Technical requirement | Test Data |
| Temperature of oven | 100° C. | 102° C. |
| Time of heating | 2 hours | 3.3 hours |
| Number of screwdriver | 3 | 3 |
| Diameter of screwdriver | 6 mm/5 mm | 6 mm/5 mm |

TABLE 4

| Results of test | | | | |
| --- | --- | --- | --- | --- |
| Item | Initial Pressure | Pressure after heating | Pressure after punch | Status of coating |
| Results | 2 Kg/cm2 | 3.6 Kg/cm2 | 3.6 Kg/cm2 | No flow or deformation |

A puncture resistant leakless material for tubeless tire was manufactured using the raw materials of Example 3. This puncture resistant leakless material was then placed into an oven for high-temperature test, and the results are as follows:

Ambient temperature: 12° C.

TABLE 5

| Setting of experimental conditions | | |
| --- | --- | --- |
| Item | Technical requirement | Test Data |
| Temperature of oven | 100° C. | 102° C. |
| Time of heating | 2 hours | 3.3 hours |
| Number of screwdriver | 3 | 3 |
| Diameter of screwdriver | 6 mm/5 mm | 6 mm/5 mm |

TABLE 6

| Results of test | | | | |
| --- | --- | --- | --- | --- |
| Item | Initial Pressure | Pressure after heating | Pressure after punch | Status of coating |
| Results | 2 Kg/cm2 | 3.5 Kg/cm2 | 3.5 Kg/cm2 | No flow or deformation |

A puncture resistant leakless material for tubeless tire was manufactured using the raw materials of Example 4. The puncture resistant leakless material was then placed into an oven for high-temperature test, and the results are as follows:

Ambient temperature: 12° C.:

TABLE 7

| Setting of experimental conditions | | |
| --- | --- | --- |
| Item | Technical requirement | Test Data |
| Temperature of oven | 100° C. | 101° C. |
| Time of heating | 2 hours | 3.3 hours |
| Number of screwdriver | 3 | 3 |
| Diameter of screwdriver | 6 mm/5 mm | 6 mm/5 mm |

TABLE 8

| Results of test | | | | |
| --- | --- | --- | --- | --- |
| Item | Initial Pressure | Pressure after heating | Pressure after punch | Status of coating |
| Results | 2 Kg/cm2 | 3.6 Kg/cm2 | 3.6 Kg/cm2 | No flow or deformation | b. Test of Low Temperature Resistance

A puncture resistant leakless material for tubeless tire was manufactured using the raw materials of Example 1. The puncture resistant leakless material was then placed into a low temperature oven for low-temperature resistance test, and the results are as follows:

Ambient temperature: 12° C.

TABLE 9

| Setting of experimental conditions | | |
| --- | --- | --- |
| Item | Technical requirement | Test Data |
| Temperature of oven | −41° C. | −39.1° C. |
| Time of low temperature | 12 hours | 15.3 hours |
| Number of screwdriver | 3 | 3 |
| Diameter of screwdriver | 6 mm/5 mm | 6 mm/5 mm |

TABLE 10

| Results of test | | | | |
| --- | --- | --- | --- | --- |
| Item | Initial Pressure | Pressure after heating | Pressure after punch | Status of coating |
| Results | 3 Kg/cm2 | 2.8 Kg/cm2 | 2.8 Kg/cm2 | Smooth without deformation |

A puncture resistant leakless material for tubeless tire was manufactured using the raw materials of Example 2. The puncture resistant leakless material was then placed into a low temperature oven for low-temperature resistance test, and the results are as follows:
Ambient temperature: 12° C.

TABLE 11

| Setting of experimental conditions | | |
| --- | --- | --- |
| Item | Technical requirement | Test Data |
| Temperature of oven | −41° C. | −37° C. |
| Time of low temperature | 12 hours | 15.3 hours |
| Number of screwdriver | 3 | 3 |
| Diameter of screwdriver | 6 mm/5 mm | 6 mm/5 mm |

TABLE 12

| Results of test | | | | |
| --- | --- | --- | --- | --- |
| Item | Initial Pressure | Pressure after heating | Pressure after punch | Status of coating |
| Results | 3.2 Kg/cm2 | 3.0 Kg/cm2 | 3.0 Kg/cm2 | Smooth without deformation |

A puncture resistant leakless material for tubeless tire was manufactured using the raw materials of Example 3. The puncture resistant leakless material was then placed into a low temperature oven for low-temperature resistance test, and the results are as follows:
Ambient temperature: 12° C.

TABLE 13

| Setting of experimental conditions | | |
| --- | --- | --- |
| Item | Technical requirement | Test Data |
| Temperature of oven | −41° C. | −39.1° C. |
| Time of low temperature | 12 hours | 15.5 hours |
| Number of screwdriver | 3 | 3 |
| Diameter of screwdriver | 6 mm/5 mm | 6 mm/5 mm |

TABLE 14

| Results of test | | | | |
| --- | --- | --- | --- | --- |
| Item | Initial Pressure | Pressure after heating | Pressure after punch | Status of coating |
| Results | 3.2 Kg/cm2 | 3.0 Kg/cm2 | 3.0 Kg/cm2 | Smooth without deformation |

A puncture resistant leakless material for tubeless tire was manufactured using the raw materials of Example 4. The puncture resistant leakless material was then placed into a low temperature oven for low-temperature resistance test, and the results are as follows:
Ambient temperature: 12° C.

TABLE 15

| Setting of experimental conditions | | |
| --- | --- | --- |
| Item | Technical requirement | Test Data |
| Temperature of oven | −41° C. | −39.1° C. |
| Time of low temperature | 12 hours | 15.5 hours |
| Number of screwdriver | 3 | 3 |
| Diameter of screwdriver | 6 mm/5 mm | 6 mm/5 mm |

TABLE 16

| Results of test | | | | |
| --- | --- | --- | --- | --- |
| Item | Initial Pressure | Pressure after heating | Pressure after punch | Status of coating |
| Results | 3.2 Kg/cm2 | 3.0 Kg/cm2 | 3.0 Kg/cm2 | Smooth without deformation |

Example 6

Running Test After Punch
Conditions:
1. Ambient temperature: 30-37° C.; Test site: Hainan Province;
2. Pretreatment of tires: using the four tires respectively produced by Example 1 to 4 as the test car's left front, left rear, right from and right rear tires, punching each of them. circumferentially 20 times with a 6 mm screwdriver, and nailing in 3 steel nails.
Test Process:
1. fixing the four tires CM the test car, load-bearing of each tire: 410 kg;
2. measuring the temperature and pressure of The tires at the beginning of the test and recording the data;
3. test speed: 120-150km/h; distance: 1000 km;
4. measuring the temperature and pressure of the tires after the test and recording the data;
5. unloading the tires from the car and checking whether the air tightness of the tires is good or not.

TABLE 17

| testing results: | |
| --- | --- |
| Item | Test Data |
| Beginning pressure (temperature) | Left front: 230 kPa (33° C.) |
| | Left rear: 230 kPa (34° C.) |
| | Right front: 230 kPa (34° C.) |
| | Right rear: 230 kPa (34° C.) |
| Pressure (temperature) of the tire after running 1000 km with high speed | Left front: 250 kPa (55° C.) |
| | Left rear: 250 kPa (55° C.) |
| | Right front: 250 kPa (57° C.) |
| | Right rear: 250 kPa (58° C.) |

I claim:
1. A method for manufacturing puncture resistant leakless material having a thermoplastic elastomer as a framework material, comprising the steps:
(1) stirring raw material A in a reactor for foaming for 12 to 24 hours;
(2) incubating raw material B in an internal mixer for 30 minutes at a constant temperature of 120° C., discharging, cooling, crushing the raw material B to particles, and allowing the particles to remain still for 48 hours;
(3) preparing raw material C;
(4) mixing the raw material A from step (1) and the raw material B from step (2) at a ratio of A:B=1:0.4-0.75, supplying the mixed material into an extruder, and adding the component C in when ⅓ of the mixture of the raw material A and the raw material B has been extruded, wherein the extruder is connected to a reactor and a stirrer, and wherein the stirrer is rotating at 120 revolutions per minute; and
(5) after adding all the raw materials, refluxing and stirring at 225° C. for 4 hours until all the raw materials melt completely, discharging and cooling to 170-190° C. to obtain the puncture resistant leakless material, wherein a combination of raw materials A, B, and C is selected from the group consisting of;

a) raw material A, which contains 100 portions of SEPS by weight and 80 to 150 portions of MDT silicone oil by weight; component B, which contains 60 portions of silicon rubber by weight, 30 to 50 portions of carbon black by weight, 5 to 20 portions of microsilica by weight and 5 to 20 portions of calcium carbonate by weight; and component C, which contains 0.5 to 2 portions of polyether modified silicone oil by weight, 10 to 30 portions of di(tert-butoxy)diacetoxy-silane, 0.6 to 1.2 portions of dibutyltin dilaurate by weight and 0.5 to 1.5 portions of a cross-linking agent by weight;

b) component A, which contains 100 portions of SEBS by weight and 150 to 300 portions of naphthenic hydrocarbon oil by weight; component B, which contains 50 portions of butyl rubber by weight, 10 portions of chlorobutyl rubber by weight, 10 portions of polybutylene by weight, 30 to 50 portions of carbon black by weight, 10 to 30 portions of calcium carbonate by weight, 10 to 20 portions of argil by weight, 1 to 5 portions of softener by weight and 1 to 5 portions of zinc oxide by weight; and component C, which contains 5 portions of modified resin by weight, 100 to 150 portions of terpene resin by weight, 25 to 50 portions of petroleum resin by weight and 1.5 to 3 portions of coupling agent by weight; and c) component A, which contains 100 portions of SEEPS by weight and 100 to 250 portions of paraffin oil by weight; component B, which contains 40 portions of bromobutyl rubber by weight, 20 portions of ethylene propylene rubber by weight, 30 to 50 portions of carbon black by weight, 1 portion of magnesium oxide by weight, 1 to 5 portions of zinc oxide by weight, 3 to 5 portions of stearic acid by weight, 2 portions of DM by weight, 10 to 20 portions of talc powder by weight, 10 to 20 portions of diatomite by weight and 2 to 5 weight portions of softener by weight; and component C, which contains 80 to 120 portions of terpene resin by weight, 50 to 80 portions of petroleum resin by weight and 1.5 to 3 portions of coupling agent by weight.

2. A puncture resistant leakless material manufactured by the method of claim 1.

3. A method for spray coating a tubeless tire with the puncture resistant leakless material manufactured by the method of claim 1, comprising the following steps:

(1) turning on a general power supply of a spraying equipment, setting up a melting reactor at a temperature of 240° C., setting up a gathering vessel at a temperature between 180° C. and 220° C., setting up a spraying pump at a temperature between 180° C. and 220° C., and setting up a spraying pipe at a temperature of 180° C.;

(2) gradually adding the puncture resistant leakless material to the melting reactor for melting, introducing the melted puncture resistant leakiess material into the gathering vessel, stirring the puncture resistant leakless material to reach a uniformed temperature, and starting to spray when the gathering vessel is more than 50% filled; and (3) placing a clean and dry tire in the spraying equipment in a suitable position, setting a rotate speed and a spray time suitable for the tire, and starting to a spraying process comprising the steps of:

a) smoothly rotating the tire at 150 revolutions per minute;
b) moving the spraying pipe to a preset position;
c) heating the spray coating surface of the tire with a heated air for about 1 minute to reach a temperature of 60° C. to 70°C;
d) spraying the puncture resistant leakless material to the spray coatin.g surface of the tire at an output of 1 kilogram per 5 seconds to reach a desired spraying effect;
e) stopping spraying and rotating the tire at a speed of 250 revolutions per minute to improve adhesion between the sprayed puncture resistant leakiess material and the tire, dynamic balance of the tire, surface flatness and smoothness of the tire; and
f) blowing cool air to the spray coating surface while increasing the speed of rotation for about 2 minutes to reach a temperature of 120° C. resetting the spraying equipment, and retrieving the tire.

* * * * *